INVENTOR
ERICH WEIMAR

United States Patent Office 3,531,897
Patented Oct. 6, 1970

3,531,897
FLEXIBLE GASKET STRIP CONSTRUCTION
Erich Weimar, Viersen, Rhineland, Germany, assignor to Draftex G.m.b.H., Viersen, Rhineland, Germany, a manufacturing organization of Germany
Filed Mar. 22, 1967, Ser. No. 625,097
Claims priority, application Germany, Mar. 23, 1966,
D 33,111
Int. Cl. E06b 7/16
U.S. Cl. 49—495    4 Claims

ABSTRACT OF THE DISCLOSURE

A gasket strip construction of V-shaped cross section suitable for sealing windows, etc., comprising a spring reinforcing member having a backbone of U-shaped cross section forming a channel and a plurality of equally spaced fingers extending outwardly from edges of the channel. The reinforcing member is embedded in a body of elastomer material forming a base and walls. Longitudinal sealing lips on each wall are disposed in confronting relation to each other.

BACKGROUND OF THE INVENTION

This invention relates to a gasket construction which is frictionally mounted on a mounting strip and spring loaded by a protected metal reinforcing strip clip to hold the strip in place.

In prior devices of this class when the sealed item such as an automobile window had sharp corners it very often became necessary to cut the gasket strips into separate side pieces resulting in poor sealing at the corners.

To prevent many occurrences of this drawback it has been found desirable to make the strip sufficiently flexible so that it could be readily placed in a single strip around relatively sharp corners.

SUMMARY OF THE INVENTION

In the preferred embodiment of this invention the above recited drawback is overcome and flexibility is obtained by making the metal reinforcing strip clip, which is embedded in an elastomer covering, in the form of a single linear backbone strip with outstanding straight rectilinear ribs integral with the backbone strip.

BRIEF DESCRIPTION OF THE DRAWING

The invention will be better understood by reference to the following specification and attached drawing in which.

DESCRIPTION OF THE PREFERRED EMBODIMENT

Figure 1:
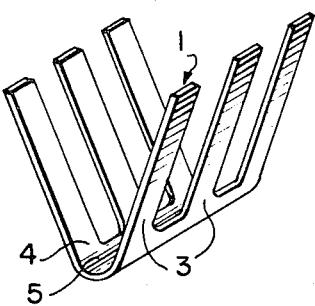
FIG. 1 is a perspective view of the novel metal reinforcing strip clip itself used in the described gasket construction.
Figure 2:
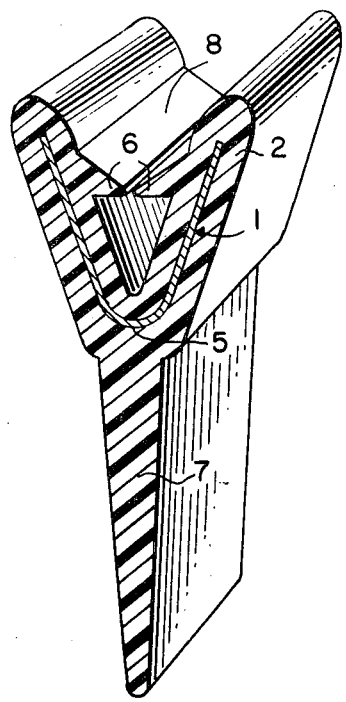
FIG. 2 is a sectional perspective view of the gasket showing the reinforcing clip strip in place.

Referring now to the drawing in greater particularity the numeral 1 generally indicates the reinforcing metal strip clip. As seen in FIGS. 1 and 2 the clip is preferably shown as V-shaped in cross-section. It should, however, be understood that such a clip may also be U-shaped in cross-section or analogous in shape. The backbone strip, which is indicated by the numeral 4, is shown to be slightly curved in cross-section and extending upwardly from the backbone strip a short distance sufficient to form a supporting base for the outstanding ribs 3. In the depicted embodiment these ribs are straight rectilinear pieces equidistantly spaced from each other.

FIG. 2 shows the completed gasket formed of an elastomer 2 such as rubber or plastic with the strip clip 1 of FIG. 1 in place. Depending vertically beneath the backbone 5 of the clip 1 is a sealing flange 7 preferably made of the same elastomer as the remainder of the gasket. Within the retaining opening 8 of the gasket are two spaced parallel sealing lips placed one on each leg of the gasket and indicated as 6. It is these lips 6 which hold the gasket in place on a mounting strip due to the force imposed by the flexure of ribs 3 under the spreading force of the mounting strip (not shown).

It is to be understood that terms of reference such as "upwardly," "outwardly," etc. are merely used to relate portions of the described and claimed structure with one another and are not intended in any way to limit the orientation of the claimed combination.

I claim:
1. In a reinforced gasket of V-shaped cross section for windows and the like including a base and walls diverging outwardly from the base
   (A) a flexible metallic strip including a backbone of U-shaped cross section presenting a channel terminating in edges, and a plurality of equally spaced rectilinear ribs integrally joined to said backbone and extending outwardly from said edges in diverging relation; and
   (B) a body of elastomer material in which said flexible strip is embedded and constituting said base and walls; and a longitudinal sealing lip on each of said walls, integral therewith and extending towards the other wall, with the sealing lip on one wall on confronting relation to the sealing lip on the other wall.
2. The reinforced gasket of claim 1 in which the ribs extending from one edge of the backbone are arranged opposite to the ribs extending from the other edge of the backbone.
3. The reinforced gasket of claim 1 together with a depending flange integrally joined to the base midway thereof and extending therefrom in a plane substantially midway of said diverging walls.
4. The reinforced gasket of claim 3 in which the sealing flange is of tapered cross section with its wider dimension at the integral joindure of the flange to the base.

References Cited
UNITED STATES PATENTS

| | | | |
|---|---|---|---|
| 2,954,310 | 9/1960 | Truesdell | 161—100 |
| 3,167,856 | 2/1965 | Zoller | 49—490 X |
| 3,310,928 | 3/1967 | Weimar | 49—491 X |
| 3,363,364 | 1/1968 | Cadiou | 49—496 X |
| 3,222,769 | 12/1965 | Le Plae | 52—716 X |

FOREIGN PATENTS

| | | |
|---|---|---|
| 1,356,712 | 2/1964 | France. |
| 1,406,912 | 6/1965 | France. |
| 1,420,106 | 10/1965 | France. |

ROBERT F. BURNETT, Primary Examiner

R. O. LINKER, Jr., Assistant Examiner

U.S. Cl. X.R.
49—490, 496